(12) United States Patent
Evers

(10) Patent No.: US 7,452,416 B2
(45) Date of Patent: Nov. 18, 2008

(54) CATIONIC TITANIUM DIOXIDE PIGMENTS

(75) Inventor: Glenn R. Evers, Hockessin, DE (US)

(73) Assignee: CPM Industries, Wilmington, DE (US)

( * ) Notice: Subject to any disclaimer, the term of this patent is extended or adjusted under 35 U.S.C. 154(b) by 0 days.

(21) Appl. No.: 11/587,345

(22) PCT Filed: May 17, 2005

(86) PCT No.: PCT/US2005/017155

§ 371 (c)(1),
(2), (4) Date: Oct. 5, 2007

(87) PCT Pub. No.: WO2005/116145

PCT Pub. Date: Dec. 8, 2005

(65) Prior Publication Data

US 2008/0108740 A1     May 8, 2008

Related U.S. Application Data

(60) Provisional application No. 60/571,865, filed on May 17, 2004.

(51) Int. Cl.
*C09C 1/36* (2006.01)
*C09C 3/10* (2006.01)
*D21B 1/00* (2006.01)
*D21H 17/20* (2006.01)
*D21H 17/67* (2006.01)

(52) U.S. Cl. .................. 106/447; 106/448; 162/162; 428/403; 428/404; 428/407; 523/205; 523/206; 524/413; 524/497; 524/847

(58) Field of Classification Search .............. 106/447, 106/448; 162/162; 428/403, 404, 407; 523/206; 524/413, 497, 847

See application file for complete search history.

(56) References Cited

U.S. PATENT DOCUMENTS

| | | | | |
|---|---|---|---|---|
| 3,150,110 A | * | 9/1964 | Becker, Jr. et al. | 523/220 |
| 4,025,483 A | * | 5/1977 | Ramig, Jr. | 523/334 |
| 4,283,320 A | * | 8/1981 | Carroll et al. | 524/522 |
| 4,315,959 A | * | 2/1982 | Brandts Buys et al. | 427/214 |
| 4,733,005 A | * | 3/1988 | Schmidt et al. | 560/222 |
| 4,771,086 A | * | 9/1988 | Martin | 523/205 |
| 4,800,103 A | * | 1/1989 | Jeffs | 427/221 |
| 4,997,864 A | * | 3/1991 | Waters | 523/319 |
| 5,049,594 A | * | 9/1991 | Jeffs | 523/205 |
| 5,412,019 A | | 5/1995 | Roulstone et al. | |
| 5,534,585 A | | 7/1996 | Roulstone et al. | |
| 5,705,033 A | | 1/1998 | Gerard et al. | |
| 5,808,118 A | | 9/1998 | Atkinson | |
| 6,080,802 A | * | 6/2000 | Emmons et al. | 523/205 |
| 6,410,614 B1 | | 6/2002 | Jones et al. | |
| 6,586,520 B1 | | 7/2003 | Canorro et al. | |

\* cited by examiner

*Primary Examiner*—Anthony J Green
(74) *Attorney, Agent, or Firm*—RatnerPrestia

(57) ABSTRACT

A composition containing cationic pigment particles includes titanium dioxide particles to which are bound a first water-soluble cationic polymer and cationic polymer latex particles. In some embodiments the cationic latex is made by treating an anionic latex with a second water-soluble cationic polymer, which may be the same as or different from the first water-soluble cationic polymer. The compositions may be used in papermaking applications, both for internal addition and or coatings.

30 Claims, No Drawings

CATIONIC TITANIUM DIOXIDE PIGMENTS

CROSS REFERENCE TO RELATED APPLICATIONS

This application claims priority of provisional U.S. Patent Application No. 60/571,865, filed May 17, 2004.

FIELD OF THE INVENTION

This invention relates to titanium dioxide pigments. More particularly, it relates to titanium dioxide pigments that are cationically charged and that are useful in papermaking and other applications.

BACKGROUND OF THE INVENTION

A longstanding problem in the paper industry is that titanium dioxide, which is commonly used as a pigment to enhance whiteness and opacity in paper, is not readily retained by the cellulosic fibers of the paper during the papermaking process. This is particularly a problem in that losses of titanium dioxide due to poor retention results in increased costs in an industry that operates on very low margins. Difficulties in obtaining satisfactory retention of titanium dioxide stem at least partly from the fact that cationic charge, which is very helpful in retaining materials on the naturally anionic paper pulp, is difficult to maintain on titanium dioxide particles. Improvements in positive charge retention on titanium dioxide particles would therefore be very useful, both for titanium dioxide added to the pulp slurry during papermaking and for surface-treating a wet paper web for purposes of coating the paper.

SUMMARY OF THE INVENTION

In one aspect, the invention provides a composition comprising cationic pigment particles. The pigment particles comprise:
  a) titanium dioxide particles;
  b) a first water-soluble cationic polymer bound to the titanium dioxide particles in an amount sufficient to render the titanium dioxide particles cationic; and
  c) cationic polymer latex particles, the particles being bound to the titanium dioxide particles.

In another aspect, the invention provides a method of making a composition comprising cationic pigment particles. The method comprises:
  a) mixing together titanium dioxide particles and an aqueous first water-soluble cationic polymer, thereby providing cationic titanium dioxide particles; and
  b) mixing the product of step a) with a cationic polymer latex.

In yet another aspect, the invention provides a composition made by the method immediately above.

In a further aspect, the invention provides a method of making paper. The method comprises contacting pulp fibers with a composition comprising cationic pigment particles, which comprise:
  a) titanium dioxide particles;
  b) a first water-soluble cationic polymer bound to the titanium dioxide particles in an amount sufficient to render the titanium dioxide particles cationic; and
  c) cationic polymer latex particles, the particles being bound to the titanium dioxide particles.

DETAILED DESCRIPTION OF THE INVENTION

Cationic Titanium Dioxide Pigment Composition

The invention provides compositions comprising cationic pigment particles. The pigment contains titanium dioxide particles, a water-soluble cationic polymer bound to the titanium dioxide particles, and polymer latex particles, which are also bound to the titanium dioxide particles. As used herein, the term "bound" as applied to particles and/or water-soluble cationic polymers means that at least a portion of each of the items being bound is adsorbed, absorbed, covalently bonded, ionically bonded, or otherwise attached either reversibly or irreversibly to the other. Such attachment may be either direct, or through an intervening material, such as one of the other components of the composition. As used herein, the term "water-soluble" when applied to a polymer includes polymers that can be dissolved or otherwise stably dispersed in water, and it includes such polymers even when bound to a particle of pigment or latex.

Compositions according to the invention may consist essentially of the titanium dioxide particles, the water-soluble cationic resin, and the polymer latex particles, and may therefore be essentially dry. Dry composition may suitably be incorporated into a finished item, such as a web, roll, or sheet of paper, and this is one particularly useful application of the compositions of the invention. Such use may provide paper of high opacity and/or brightness, and may for example be achieved by adding the composition as a dispersion to the wet end of a papermachine, such that the cationic titanium dioxide-latex particles are retained in the resulting paper sheet. Alternatively, the composition may be applied to the surface of a paper web, thereby providing a coating.

The relative amounts of the titanium dioxide particles, the cationic resin, and the latex particles may be varied over a considerable range, provided that the resulting pigment particles are sufficiently cationic as to be effectively retained on anionically charged materials (for example paper pulp fibers). As used herein, the term "cationic" as applied to a particle, whether of a latex, of titanium dioxide, or of a pigment particle according to the invention, means that the particle in water has a zeta potential greater than zero throughout a pH range of 3-8, and typically over an even broader range of 2-9. In addition, the water-soluble cationic polymer is present in an amount sufficient to make the titanium dioxide particles themselves cationic, prior to the addition of the latex. Typically, the loading of cationic polymer is between 0.1 wt % and 5 wt % based on titanium dioxide (i.e., grams of polymer per gram of titanium dioxide), more typically between 0.3 wt % and 2.3 wt % based on titanium dioxide. The water-soluble cationic polymer may be a single polymer, or it may be a mixture of two or more polymers. In some embodiments of the invention, a first portion of the total water-soluble cationic polymer is provided as an aqueous solution, while a second portion is provided in the form of a cationic latex formed by the interaction of another (or the same) water-soluble cationic polymer with an anionic latex, thereby changing the charge on the latex from anionic to cationic. Typically the polymer latex particles, whether of this type or cationic to begin with, are present in an amount equal to between 0.1 wt % and 10 wt % based on titanium dioxide, more typically between 0.3 wt % and 1.2 wt % based on titanium dioxide.

In some embodiments of the invention, the cationic pigment particles are in the form of an aqueous slurry, which may be of any concentration. Typically, such slurries contain between about 10 wt % and 55 wt % of titanium dioxide, and more typically between about 20 wt % and 35 wt %. Unless otherwise specifically indicated, weight percentages provided herein are based on the total weight of the composition, including any water (if present). In still other embodiments, the composition is highly diluted with water and further comprises pulp fibers to which the cationic pigment particles are bound. In one typical application, such a composition may be found in the thick stock and/or the thin stock of a papermachine, during the process of making paper.

Other anionic substrates may also be pigmented with the compositions of this invention. Such substrates may include for example glass fibers, anionic minerals such as natural clays, bentonite, synthetic clays, alumina trihydrate, silica gel, ground calcium carbonate, zeolites, calcium sulfate, barium sulfate, lithopone, zirconium oxide, aluminum oxide, silicon dioxide, precipitated silica and aluminosilicates, colloidal silica and alumina, and silica microgels. Other substrates may include anionic organic pigments such as melamine formaldehyde, acrylic and styrenic pigments. Inorganic and organic pigments may be solid or have porous and/or hollow shell structures.

Titanium Dioxide Particles

Titanium dioxide ($TiO_2$) particles suitable for use according to the invention may be any anatase or rutile titanium dioxide known in the art for use as a pigment, and includes for example material produced by a chloride process or a sulfate process, such as are commonly practiced in the art. It may also include zirconia-coated, magnesia-coated, alumina-coated and/or silica-coated titanium dioxide, all of which are well known in the art, or any other surface-modified titanium dioxide such as that treated with an organic silane, siloxane, or polyphosphonate. Aminosilane surface treatment of titanium dioxide may optionally be used to impart a cationic charge on the dry pigment before it is incorporated into a composition according to the invention. Typically, the titanium dioxide will be of pigment grade, and will generally be slightly acidic. It will typically have a pH greater than the isoelectric point of the pigment, although this is not required. The pH of the titanium dioxide particles may be adjusted to a desired value by any means known in the art, including for example treatment with compounds such as ammonium phosphate, triethanolamine, or aminomethylpropanol.

$TiO_2$ having an average particle size of at least 0.25 micron and less than 1 micron is suitable, and more typically the average particle size is between 0.25 and 0.4 micron. Especially preferred is $TiO_2$ that is pre-ground to pigmentary size by an air or steam fluid energy mill. Also suitable is $TiO_2$ where the particles have been reduced in size by a wet grinding method, for example as disclosed in U.S. Pat. No. 5,270,076, to break up and disperse aggregates and agglomerates of $TiO_2$. If a wet grinding method is used, it will typically be performed at a $TiO_2$ loading level of about 35-50 wt %, preferably 35-45 wt %, based on the combined weight of the aqueous medium and the $TiO_2$.

Cationic Polymer

Suitable cationic polymers include water-soluble polymers of any of a variety of types. Examples of useful polymers include polydiallyldimethylammonium chlorides such as RETEN 203 (available from Hercules Incorporated of Wilmington, Del.) and cationic polyacrylamides, many of which are known in the papermaking art. Also suitable are polyethylenimines, since some of the amine groups are protonated at pH values less than 7, making the polymer cationic under these conditions. The cationic polymer may also be a polyaluminum chloride, commonly referred to in the industry as PAC. In some embodiments of the invention, the PAC is of the formula $[Al_n(OH)_mCl_{3n-m}]_x$ wherein x is an integer from about 10 to 20, formed by reaction of a base, or a salt of a weak acid and a strong base, with aluminum chloride.

In one exemplary embodiment of the invention, the water-soluble cationic polymer comprises a thermosetting resin containing azetidinium groups. In particular, the polymer may be a polyamidoamine-epichlorohydrin (PAE) resin, such as is available in aqueous solution from Hercules Incorporated under the name KYMENE 557LX.

Polymer Latex

As used herein, the term "polymer latex particle" means a particle of an organic resin that is dispersed in an aqueous medium, or such a particle that has become bound to another particle and which may or may not be any longer present in an aqueous medium. It will be appreciated by the person of ordinary skill in the polymer art that a particle that has been removed from a latex may be somewhat altered in composition and/or shape, and a latex particle thus altered will be understood to still be within the meaning of "polymer latex particle" as used according to the present invention. A wide variety of polymers are available in latex form, and many are useful in the practice of this invention. Suitable latexes include those based on polymers including, as nonlimiting examples, vinyl ester/(meth)acrylic, vinyl acetate (meth) acrylic, vinyl acetate/ethylene, and styrene/butadiene copolymers.

Particularly suitable latex polymers are those based on film-forming polymers, nonlimiting example so which include ethylene-vinyl chloride copolymers, such as are available from Air Products and Chemicals, Inc. of Allentown, Pa. under the names AIRFLEX 4500, 4514, and 4530. Especially useful are polymers having a glass transition temperature between about 18° C. and 25° C., whose use may result in a more robust binding of the titanium dioxide particles to the substrate to which the pigment is to be applied. The latexes, which are cationic, may obtain their positive charge by virtue of including a cationic comonomer, or by virtue of being made in the presence of a cationic dispersant.

Alternatively, in some embodiments the cationic latex is based on a latex made in the presence of an anionic dispersant, subsequently contacted with a water-soluble cationic polymer that binds to the latex, thereby rendering it cationic. Cationic latexes of this last type are disclosed for example in U.S. Pat. No. 6,586,520 B1 to Canorro et al. One example is available from Hercules Incorporated of Wilmington, Del. under the name HERCOBOND CX 9207. Cationic polymers suitable for the purpose of converting an anionic latex to a cationic one include those described herein above, and the polymer may be the same as or different from the one(s) with which the titanium dioxide is mixed prior to the addition of the latex. In one exemplary embodiment of the invention, the water-soluble cationic polymer comprises a thermosetting resin containing azetidinium functionality. In particular, the polymer may be a polyamidoamine-epichlorohydrin (PAE) resin, such as KYMENE 557LX. The weight ratio of water-soluble cationic resin to anionic polymer latex used in converting the latex to cationic form is typically between 5:1 and 1:1, although other ratios may be used.

Preparation of the Composition

In general, methods of making cationic $TiO_2$ pigments such as those described above may include the steps of mixing together titanium dioxide particles and an aqueous first water-soluble cationic polymer, and combining that mixture with a polymer latex. Typically, the titanium dioxide particles are added slowly with strong agitation to at least a portion of the water-soluble cationic polymer, in an aqueous mixture. In some embodiments, a suitable acid such as a mineral acid or citric acid is added, either all before the titanium dioxide is added or incrementally along with it, to maintain a sufficiently low pH. Typically, a pH between 4.0 and 5.0 is desired, but other values may be acceptable, depending upon the type of titanium dioxide, cationic polymer, and polymer latex used. The desired pH may be arrived at by adjusting the pH of the cationizing polymer or the titanium dioxide after it has been treated with the polymer, or by adjusting the pH of the polymer latex or of the titanium dioxide after it has been treated with the latex, or both.

During the addition of titanium dioxide particles, the viscosity of the mixture increases as the process progresses, and the rise accelerates rapidly as the isoelectric point pH of the added titanium dioxide (typically between about 4.0 and 8.0, depending upon the type) is approached. At a point before the viscosity becomes so high that the mixture is difficult to agitate (typically just short of this point), the latex is added, resulting in an immediate and substantial decrease in viscosity. In some cases, for example where the cationic polymer is of relatively high molecular weight (above about 200,000), thickening may occur more rapidly with increasing $TiO_2$ content, and in such cases the addition point for the latex may be at a lower wt % of $TiO_2$ than when a lower molecular weight cationic polymer is used.

EXAMPLES

Following is an exemplary general procedure for preparing an aqueous cationic pigment dispersion according to the invention. Pre-ground, dry pigmentary $TiO_2$ having a pH of 6.8 is dispersed into pH 2.5 water containing KYMENE 557 LX (Hercules, Inc.) and sulfuric acid so that the final composition has 4 wt % PAE (dry solids/dry $TiO_2$). A high-speed 2000-10000 rpm Haukmeyer disperser with a saw tooth 50 mm Cowles blade is used to break up agglomerates during dispersion. As $TiO_2$ pigment is added to the acidic pH 2.5 KYMENE/water blend, the slurry pH increases. Slurry viscosity, measured on a Brookfield Model RVT viscometer at 100 rpm with a #4 spindle, increases at higher $TiO_2$ solids. Also, a very rapid increase in viscosity occurs as the pH of the slurry grind pH approaches the $TiO_2$ isoelectric point (IEP). At a percent solids greater than about 35, a cationic latex (Hercules HERCOBOND CX 9207, made by contacting an anionic latex with a water-soluble cationic resin as described in U.S. Pat. No. 6,586,520) is quickly added in an amount such that the final slurry composition contains 4 wt % dry solids latex (based on dry $TiO_2$). The slurry viscosity quickly decreases due to the addition of the cationic latex.

Further specific examples follow.

Example 1

Table 1 shows the effect of $TiO_2$ percent solids on the viscosity of dispersions including a cationic PAE resin (KYMENE 557 LX) at constant pH, and the dramatic reduction in viscosity when a cationic latex is added (see sample D). During the experiment, incremental amounts of PAE were co-added as the $TiO_2$ was added to the mixture to maintain a final PAE concentration greater than 2 wt % in samples A and B. Sample C had a PAE concentration of 1.69 wt % (dry PAE based on dry solids $TiO_2$), with sample D reflecting an increase from this level to 2.3 wt % based on the addition of a cationic latex (HERCOBOND CX 9207, previously designated PPD 1107) incorporating KYMENE 557 LX and an anionic SBR latex (glass transition temperature 22° C.) in a 1:1 weight ratio on a solids basis. The pH increased as more $TiO_2$ was added, and this increase was counteracted by adding incremental amounts of sulfuric acid to maintain the pH at 4.5. As can be seen, the addition of the cationic latex in sample D resulted in a substantial decrease in dispersion viscosity from a cream-like 920 cp to a very fluid 290 cp. Mixtures comparable to sample D, in which however pH reduction to 4.3 was effected with either sulfuric acid or PAE (KYMENE 557LX) and no latex, produced an off-scale viscosity increase.

TABLE 1

| Sample | Wt % $TiO_2$ Solids | Viscosity, cp | Slurry pH |
|---|---|---|---|
| A | 34.6 | 20 | 4.6 |
| B | 43.1 | 100 | 4.5 |
| C | 50.1 | 920 | 4.5 |
| D | 49.5 | 290 | 4.3 |

Table 2 shows the compositions of Samples A-D with respect to the relative amounts of the components.

TABLE 2

| Sample | Wt % $TiO_2$ Solids | PAE solids (dry/dry $TiO_2$) | Latex CX 9207, Wt % (dry/dry $TiO_2$) | Slurry pH |
|---|---|---|---|---|
| A | 34.6 | 2.25 | 0 | 4.6 |
| B | 43.1 | 2.25 | 0 | 4.5 |
| C | 50.1 | 1.69 | 0 | 4.5 |
| D | 49.5 | 2.23* | 1.16 | 4.3 |

*Includes 0.58 contributed by the CX 9207 latex.

Example 2

A 0.1-gram droplet of each of four $TiO_2$ dispersions (sample B, sample D, T4000 commercial anatase $TiO_2$, and RPS-VANTAGE commercial rutile $TiO_2$) was placed on dry lap pulp to evaluate $TiO_2$ affinity for the fiber. After a 10-second contact time, the pulp holding the droplet of $TiO_2$ was placed in water and allowed to soak for 3 minutes, after which the water turbidity was measured on a scale of 0-100 NTU. As seen in Table 3, the latex-stabilized $TiO_2$ (D) of this invention did not redisperse significantly in the water, but rather remained attached to the fiber as evidenced by the low turbidity.

TABLE 3

| Sample | Turbidity, NTU | Water Appearance |
|---|---|---|
| D | 10 | Clear |
| B | Off-scale | Opaque |
| T4000 (3) | Off-scale | Opaque |
| RPS-VANTAGE (4) | Off-scale | Opaque |

(3) anionic polyacrylic acid dispersed, sulfate process anatase, available from Millennium Chemicals, division of Lyondell Chemical Company of Houston, TX
(4) anionic polyacrylic acid dispersed, chloride process rutile, available from DuPont, Inc. of Wilmington, DE.

Example 3

TAPPI standard handsheets were prepared using a 70/30 softwood/hardwood pulp at 350 CSF freeness at pH 8, and using BMB cationic starch at a 1 wt % addition level (based on pulp) and Eka NP 780 colloidal silica at a 0.05% addition level, both available from Eka Chemicals Inc. of Marietta, Ga., as retention aids. As seen in Table 4, evaluation of first-pass retention of $TiO_2$ showed markedly improved affinity for pulp fiber using the cationically stabilized $TiO_2$ of this invention versus two conventional anionic $TiO_2$ slurries.

TABLE 4

| Sample | % TiO$_2$ Retention |
| --- | --- |
| D | 69 |
| T4000 | 33 |
| RPS-VANTAGE | 23 |

Example 4

Staged addition of polyaluminum chloride (PAC) while adding anatase TiO$_2$ to water yielded a high solids cationic TiO$_2$ slurry. A small amount of PAC (ATC 8210, from Eka Chemicals) was added to 99 grams of deionized water, followed by dry powder TiO$_2$ addition and then incremental amounts of PAC followed by more TiO$_2$. The incremental addition of PAC and TiO$_2$ resulted in a good dilatant grind at 81.8 wt % solids. At this point, the mixture was diluted with water and KYMENE 557 LX to 69.9 wt % TiO$_2$ solids, resulting in a low viscosity TiO$_2$ slurry. The final concentration of PAE resin was 0.21 wt % (dry PAE on dry TiO$_2$). The results are shown in Table 5. The resulting cationic polymer-treated titanium dioxide particles may subsequently be treated with a cationic latex as described earlier to produce cationic pigment particles according to the invention.

TABLE 5

| Wt % TiO$_2$ In Slurry, Wt % | Incremental TiO$_2$ Added (gms) | Slurry pH | Slurry Viscosity (cp) | Incremental PAC Added (gms) | Wt % PAC on dry TiO$_2$ |
| --- | --- | --- | --- | --- | --- |
| 0 | 0 | 3.9 | — | 2.60 | 0 |
| 18.4 | 25 | 3.4 | — | 0 | 10.4 |
| 21.2 | 5 | 3.3 | — | 1.20 | 12.7 |
| 30.9 | 20 | 3.1 | 20 | 0 | 7.6 |
| 40.1 | 25 | 3.0 | 30 | 0 | 5.1 |
| 46.9 | 25 | 3.1 | 30 | 1.56 | 5.4 |
| 63.4 | 100 | 3.2 | 470 | 1.99 | 3.7 |
| 71.9 | 100 | — | — | 2.81 | 3.4 |
| 81.8 | 225 | 2.6 | Dilatant | 0 | 1.9 |
| 69.9* | 0 | 2.8 | 290 | 0 | 1.9 |

*PAE resin and dilution water added

Example 5

An experiment similar to that of Example 4 was performed, but all of the PAC was added initially, followed by the addition of the anatase TiO$_2$. The results are shown in Table 6.

TABLE 6

| Wt % TiO$_2$ In Slurry, Wt % | Incremental TiO$_2$ Added (gms) | Slurry pH | Slurry Viscosity (cp) | Incremental PAC Added (gms) | Wt % PAC on dry TiO$_2$ |
| --- | --- | --- | --- | --- | --- |
| 0 | 0 | 3.4 | — | 18.61 | 0 |
| 16.1 | 25 | 3.4 | — | 0 | 51.0 |
| 18.7 | 5 | 3.4 | — | 0 | 42.5 |
| 27.7 | 20 | 3.4 | 100 | 0 | 25.5 |
| 36.5 | 25 | 3.4 | 180 | 0 | 17.0 |
| 43.4 | 25 | 3.4 | 280 | 0 | 12.8 |
| 60.5 | 100 | 3.2 | 1220 | 0 | 6.4 |
| 69.7 | 100 | 3.2 | Paste | 0 | 4.3 |
| 74.9 | 89.66 | 3.2 | Paste | 0 | 3.3 |
| 61.9* | 0 | 3.2 | Paste | 0 | 3.3 |

*PAE resin and dilution water added

As can be seen in Table 6, adding all of the PAC at the beginning, before TiO$_2$ addition was initiated, resulted in a thick paste. The highest slurry grind solids was 60.5 wt % solids before the mixture turned to a paste at 69.7 wt % solids. The final concentration of PAE resin was 0.21 wt % (dry PAE on dry TiO$_2$) and the TiO$_2$ slurry was still a paste at 61.9 wt % solids. Cationic TiO$_2$ prepared in this manner may also be subsequently treated with a cationic latex as described earlier to produce cationic pigment particles according to the invention.

Compositions according to the invention are very useful in making paper, where they can be added to the pulp slurry according to methods well known in the papermaking art, resulting in paper having good brightness and opacity while losing relatively little of the pigment in the whitewater. The compositions of this invention may also be sprayed or otherwise applied to paper or other substrates, especially those having anionic surface charge, resulting in strong attachment of the pigment to the substrate.

Although the invention is illustrated and described herein with reference to specific embodiments, it is not intended that the subjoined claims be limited to the details shown. Rather, it is expected that various modifications may be made in these details by those skilled in the art, which modifications may still be within the spirit and scope of the claimed subject matter and it is intended that these claims be construed accordingly.

What is claimed:

1. A composition comprising cationic pigment particles, the pigment particles comprising:
   a) titanium dioxide particles;
   b) a first water-soluble cationic polymer bound to the titanium dioxide particles in an amount sufficient to render the titanium dioxide particles cationic; and
   c) cationic polymer latex particles bound to the titanium dioxide particles.

2. The composition of claim 1, wherein the first water-soluble cationic polymer is selected from the group consisting of polyethylenimines, polydiallyldimethylammonium chlorides, and cationic polyacrylamides.

3. The composition of claim 1, wherein the first water-soluble cationic polymer comprises azetidinium groups.

4. The composition of claim 1, wherein the first water-soluble cationic polymer comprises a polyamidoamine-epichlorohydrin polymer.

5. The composition of claim 1, wherein the first water-soluble cationic polymer comprises a polyaluminum chloride.

6. The composition of claim 1, wherein the first water-soluble cationic polymer is present in an amount equal to between 0.1 wt % and 5.0 wt % based on titanium dioxide.

7. The composition of claim 1, wherein the first water-soluble cationic polymer is present in an amount equal to between 0.3 wt % and 2.3 wt % based on titanium dioxide.

8. The composition of claim 1, wherein the polymer latex particles comprise a film-forming polymer.

9. The composition of claim 1, wherein the polymer latex particles comprise a polymer selected from the group consisting of vinyl ester/acrylic, vinyl acetate acrylic, vinyl acetate/ethylene, and styrene/butadiene copolymers.

10. The composition of claim 1, wherein the polymer latex particles comprise an ethylene-vinyl chloride copolymer.

11. The composition of claims 1, further comprising a second water-soluble cationic polymer, wherein the cationic polymer latex particles comprise anionic particles bound to the second water-soluble cationic polymer.

12. The composition of claim 11, wherein the second water-soluble cationic polymer is selected from the group consisting of polyethylenimines, polydiallyldimethylammonium chlorides, and cationic polyacrylamides.

13. The composition of claim 11, wherein the second water-soluble cationic polymer comprises azetidinium groups.

14. The composition of claim 11, wherein the second water-soluble cationic polymer comprises a polyamidoamine-epichlorohydrin polymer.

15. The composition of claim 1, wherein the polymer latex particles are present in an amount equal to between 0.1 wt % and 10.0 wt % based on titanium dioxide.

16. The composition of claim 1, wherein the polymer latex particles are present in an amount equal to between 0.3 wt % and 1.2 wt % based on titanium dioxide.

17. The composition of claim 1, wherein the composition further comprises an aqueous carrier in which the cationic pigment particles are dispersed.

18. The composition of claim 17, wherein the titanium dioxide particles constitute between 10 wt % and 55 wt % of the composition.

19. The composition of claim 17, wherein the titanium dioxide particles constitute between 20 wt % and 35 wt % of the composition.

20. The composition of claim 1, wherein the composition further comprises pulp fibers to which the cationic pigment particles are bound.

21. A method of making a composition comprising cationic pigment particles, the method comprising:
   a) mixing together titanium dioxide particles and an aqueous first water-soluble cationic polymer, thereby providing cationic titanium dioxide particles; and
   b) mixing the product of step a) with a cationic polymer latex.

22. The method of claim 21, wherein step a) comprises adding the titanium dioxide particles to the aqueous first water-soluble cationic polymer.

23. The method of claim 21, further comprising a step of adjusting the pH of the aqueous first water-soluble cationic polymer or the product of step a), or both, such that the product of step a) has a pH between 4.0 and 5.0.

24. The method of claim 21, further comprising a step of adjusting the pH of the polymer latex or the product of step b), or both, such that the product of step b) has a pH between 4.0 and 5.0.

25. The method of claim 21, wherein the cationic polymer latex comprises anionic particles to which are bound a second water-soluble cationic polymer.

26. The method of claim 21, wherein the product of step b) is essentially free of pulp fibers.

27. A composition comprising cationic pigment particles made by a method comprising:
   a) mixing together titanium dioxide particles and an aqueous first water-soluble cationic polymer, thereby providing cationic titanium dioxide particles; and
   b) mixing the product of step a) with a cationic polymer latex.

28. A method of making paper, comprising contacting pulp fibers with a composition comprising cationic pigment particles, the pigment particles comprising:
   a) titanium dioxide particles;
   b) a first water-soluble cationic polymer bound to the titanium dioxide particles in an amount sufficient to render the titanium dioxide particles cationic; and
   c) cationic polymer latex particles, bound to the titanium dioxide particles.

29. The method of claim 28, wherein the pulp fibers are in an aqueous slurry.

30. The method of claim 28, wherein the pulp fibers are in a formed sheet of paper.

* * * * *